United States Patent [19]

Weiler et al.

[11] 4,394,832

[45] Jul. 26, 1983

[54] BRAKE BOOSTER FOR AUTOMOTIVE VEHICLES

[75] Inventors: Rolf Weiler; Peter Boehm, both of Frankfurt am Main, Fed. Rep. of Germany

[73] Assignee: ITT Industries, Inc., New York, N.Y.

[21] Appl. No.: 231,838

[22] Filed: Feb. 5, 1981

[30] Foreign Application Priority Data

Mar. 20, 1980 [DE] Fed. Rep. of Germany ....... 3010605

[51] Int. Cl.³ .............................................. F15B 9/10
[52] U.S. Cl. .............................. 91/376 R; 91/369 A; 92/98 D
[58] Field of Search ............. 91/369 A, 369 B, 369 R, 91/376 R; 60/547 R, 554, 563; 92/98 R, 98 D, 99

[56] References Cited

FOREIGN PATENT DOCUMENTS

| 2922299 | 12/1979 | Fed. Rep. of Germany ... 91/369 A |
| 2031086 | 4/1980 | United Kingdom ................... 60/563 |
| 2040376 | 8/1980 | United Kingdom ............. 91/369 A |
| 2053395 | 2/1981 | United Kingdom ............. 91/369 A |

Primary Examiner—Paul E. Maslousky
Attorney, Agent, or Firm—John T. O'Halloran; Alfred C. Hill

[57] ABSTRACT

A brake booster for automotive vehicles comprises a low-pressure casing which is sealingly subdivided into a low pressure chamber and a working chamber by an axially movable wall. Axially movable wall includes a flexible diaphragm abutting a diaphragm plate. The diaphragm plate extends with radial ribs through wide longitudinal slots of a central reinforcement tube of the low-pressure casing and transmits the boosting force from the diaphragm plate to a centrally located control valve housing. A sliding element axially slidable together with the movable wall is guided at the axially extending rims of each of the longitudinal slots and overlaps the rims of the associated one of the longitudinal slots adjacent the working chamber. A rolling diaphragm of the movable wall disposed between the diaphragm plate and the reinforcement tube, rolls over the sliding element upon the boosting force movement, the sliding element bridging the longitudinal slot at this point.

14 Claims, 4 Drawing Figures

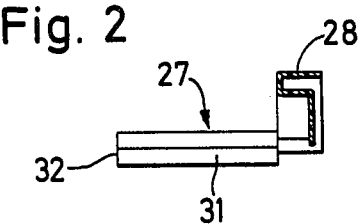
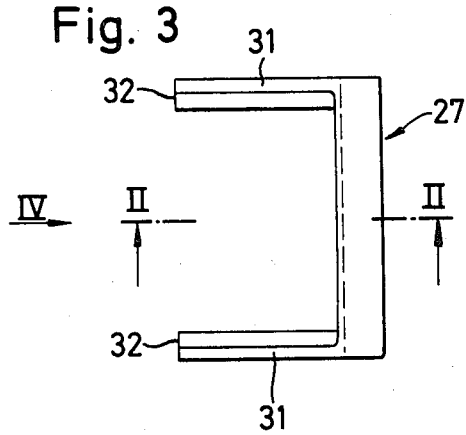
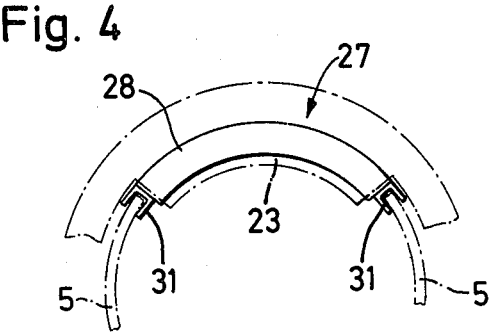

BRAKE BOOSTER FOR AUTOMOTIVE VEHICLES

BACKGROUND OF THE INVENTION

The present invention relates to a brake booster for automotive vehicles comprising a low-pressure casing sealingly subdivided into a low-pressure chamber and a working chamber by an axially movable wall, a reinforcement tube extending axially through the low-pressure casing having its ends fastened to the two end walls of the low-pressure casing and a rolling diaphragm in sealing abutment relative to the movable wall, and a mechanically actuatable control valve to connect the working chamber to the low-pressure chamber or to atmosphere. The housing of the control valve, axially movable in the reinforcement tube, is connected via a push rod with an actuating piston of a master cylinder fastened to the low-pressure casing adjacent the partial vacuum and is connected with radial ribs of the movable wall for movement therewith, the ribs projecting through longitudinal slots of the reinforcement tube, over which slots the rolling diaphragm partially rolls.

In brake boosters for automotive vehicles, it is desired to achieve a light-weight construction and a minimum possible overall length. To provide a construction of the low-pressure casing of minimum possible weight, the force, which occurs upon actuation of the brake and is transmitted from the master cylinder to the point where the brake booster is fastened to the automotive vehicle, for example, to the splashboard, is no longer transmitted via the low-pressure casing, but rather via a central reinforcement tube according to more recent suggestions. Since the control valve housing is disposed within the reinforcement tube and the axially movable wall is required to be urged in a force-transmitting engagement with the control housing, connecting members have to be guided from the movable wall, which is outside the reinforcement tube, through longitudinal slots in the reinforcement tube to connect with the control valve housing. At the same time, there is need for a movable seal between the axially movable wall and the reinforcement tube.

In a brake booster disclosed in a first copending U.S. application of J. Belart and F. Wienecke, Ser. No. 061,113 filed July 26, 1979, assigned to the same assignee as the present application, the longitudinal slots are included in the area of the working chamber, while the sliding seal of the axially movable wall on the reinforcement tube is effected in the area adjoining the longitudinal slots adjacent the low-pressure chamber. Since both the length of the longitudinal slots and the length of the adjoining seal are at least equal to the power stroke of the axially movable wall, the length of the reinforcement tube is required to be greater than double the power stroke of the movable wall, which results in a comparatively large overall length of the brake booster.

A reduced overall length of the brake booster may be achieved according to a second copending U.S. application of R. Becht and P. Bohm, Ser. No. 142,298, filed Apr. 21, 1980, assigned to the same assignee as the present application, by constructing the seal disposed between the movable wall and the reinforcement tube as a rolling diaphragm abutting the reinforcement tube when rolling out, with the rolling diaphram extending over the longitudinal slots. In order to keep the thereby occasioned additional demand upon the rolling diaphram and the resulting wear as small as possible, it is desired to construct the longitudinal slots as narrow as possible. Since the connecting members projecting through the longitudinal slots have to also be constructed accordingly narrow, the connecting members are subjected to a considerable amount of bending stress when the boosting forces are transmitted.

To avoid these disadvantages, it was suggested in a third copending U.S. application of R. Weiler, R. Becht and P. Bohm, Ser. No. 221,584, filed Dec. 31, 1980, assigned to the same assignee as the present application, to arrange the rolling diaphragm in such a manner that it does not roll out over the longitudinal slots, which then will enable the slots and the connecting members to be relatively wide. In this arrangement, however, a space is necessary in the initial or rest position between the front rim of the rolling diaphragm and the beginning of the longitudinal slots, which corresponds to at least half the power stroke of the movable wall.

SUMMARY OF THE INVENTION

It is, therefore, an object of the present invention to provide a brake booster of the type referred to hereinabove having a maximum possible reduction of the overall length without the need of providing relatively narrow longitudinal slots with regard to the rolling diaphragm.

A feature of the present invention is the provision of a brake booster for automotive vehicles comprising a low-pressure casing sealingly subdivided into a low-pressure chamber and a working chamber by an axially movable wall, a reinforcement tube extending axially through the casing having its ends fastened to the end walls of the casing and sealed to the movable wall by a rolling diaphragm, a mechanically actuated control valve to connect the working chamber with a selected one of the low-pressure chamber and atmosphere, the control valve having a housing axially movable within the tube and connected to the movable wall by ribs extending radially through longitudinal slots disposed in the tube, the rolling diaphragm rolling over at least a portion of the slots adjacent the working chamber, and a sliding element axially guided at axially extending rims of each of the slots axially displaceable together with the wall, each of the element having a covering bead which overlaps the portion of the slots between the slots and the rolling diaphragm.

In this arrangement, the covering bead of the sliding element, having moved from its initial position, will bridge the first portion of the longitudinal slot, over which the rolling diaphragm rolls. Therefore, the longitudinal slot may be of such a wide construction—without impairing the operation or the stability of the rolling diaphragm—that the radial rib is allowed to be constructed as a flat, but very wide tongue, the dimensions of which will consequently be very small in the axial direction, without the transmittance of the brake booster's boosting forces being hindered.

In an advantageous embodiment of the invention, the sliding element is urged in its initial position against the radial rib by means of a spring and includes a stop limiting its axial movement in the boosting direction, which stop cooperates with a stop surface of the reinforcement tube. This provides a limit for the sliding element's axial displacement in such a manner that, though the sliding element moves together with the movable wall at the beginning of the power stroke of the wall, the sliding element will then stop, while the wall continues to move. This arrangement affords the advantage, that the axial width of the covering bead need only be chosen such that only the area of the longitudinal slot over which the diaphragm has rolled is covered. On account of this limited axial width, the covering bead does not lie under the rolling diaphragm in its initial position. The distance between the stop and the stop surface will be chosen such that the sliding element will come to a standstill prior to being rolled over by the rolling diaphragm so that no friction at all will occur at the rolling diaphragm.

In accordance with another embodiment of the invention, the sliding element is connected to guide shoes which embrace the two lateral rims of the longitudinal slot. Thus, an exact guide of the sliding element is ensured by simple means. Suitably, the free end portions of the guide shoes form the stops for limiting the axial movement of the sliding element. The need for separate stops is obviated by this.

A stable construction and, at the same time, an effective guidance of the sliding element is accomplished by a low demand in material, if the covering beads' and/or the guide shoes' cross section is of U-shape construction.

The guide shoes' surfaces or edges of the sliding element facing the inside of the longitudinal slot, which is preferably made of plastics, are able to serve as a sliding guidance for the radial rib in accordance with an advantageous improvement of the invention, which radial rib will no longer be in direct contact with the longitudinal slot's rims in the reinforcement tube. The occurrence of wear caused by this direct contact or of disturbing operation noises is effectively avoided.

BRIEF DESCRIPTION OF THE DRAWING

Above mentioned and other features and objects of this invention will become more apparent by reference to the following description taken in conjunction with accompanying drawings in which:

FIG. 2 is a longitudinal cross-sectional view of a sliding element guided in the reinforcement tube of the brake booster of FIG. 1;

FIG. 3 is a topview of the sliding element of FIG. 2 with the cross-section of FIG. 2 being taken along line II—II of FIG. 3; and FIG. 4 is a view of the sliding element in the direction of the arrow IV in FIG. 3, with the outlines of the radial rib and of the reinforcement tube being indicated by dot-dash lines.

DESCRIPTION OF THE PREFERRED EMBODIMENTS

Figure 1:
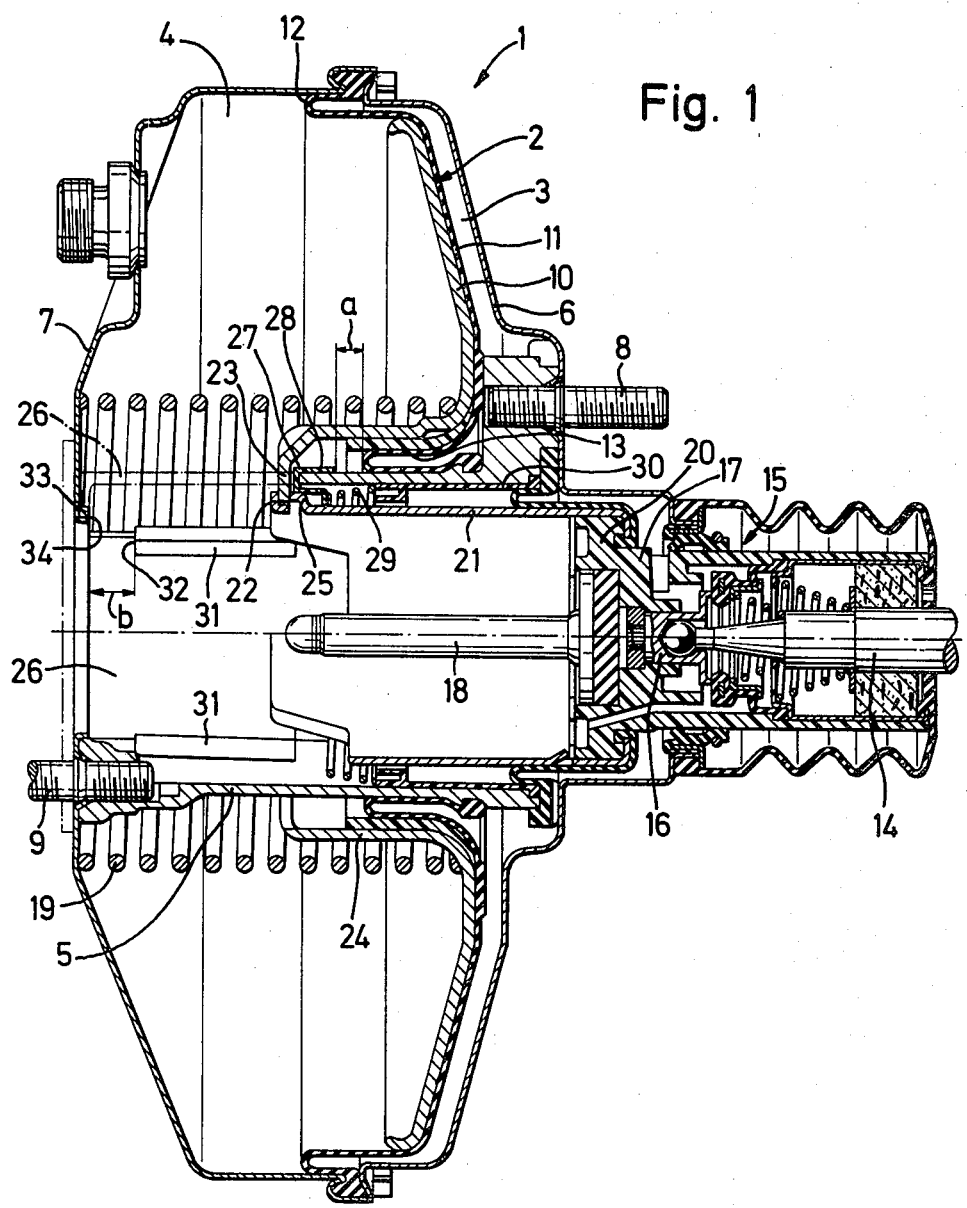
FIG. 1 is a longitudinal cross-sectional view of a brake booster in accordance with the principles of the present invention.

The brake booster illustrated in FIG. 1 includes a low-pressure casing 1 which is divided into a working chamber 3 and a low-pressure chamber 4 by an axially movable wall 2. Extending axially through low-pressure casing 1 is a reinforcement tube 5 having its ends fastened to the two end walls 6 and 7 of low-pressure casing 1 by means of the threaded bolts 8 and 9.

The axially movable wall 2 includes a diaphragm plate 10 and a diaphragm 11 which abuts thereon and is constructed as a rolling diaphragm 12 in the area between the outer periphery of diaphragm plate 10 and the circumferential wall of low-pressure casing 1 and another rolling diaphragm 13 in the area between diaphragm plate 10 and reinforcement tube 5, by which rolling diaphragms 12 and 13 movable wall 2 is sealed relative to low-pressure casing 1 and reinforcement tube 5.

A control valve 15 which is actuatable by a piston rod 14 is disposed at the end of reinforcement tube 5 adjacent working chamber 3 and includes a control valve piston 16 which is connected to piston rod 14 and which opens valve openings in a control valve housing 17 such that working chamber 3 is connected to low-pressure chamber 4 in the inactive position illustrated in FIG. 1. When control valve 15 is actuated, i.e. when piston rod 14 is axially displaced, the connection between low-pressure chamber 4 and working chamber 3 is interrupted, and working chamber 3 is connected to atmosphere so that movable wall 2 will move towards low-pressure chamber 4.

The axially movable valve housing 17 communicates with a push rod 18 which acts on an actuating piston of a master cylinder (not shown) of the brake unit, which master cylinder is secured to the end of reinforcement tube 5 adjacent low-pressure chamber 4 by means of threaded bolts 9. A compression spring 19 bearing against end wall 7 of low-pressure casing 1 and against diaphragm plate 10 maintains movable wall 2 resiliently in the illustrated initial position.

Control valve housing 17, being made of plastics in the case of the illustrated embodiment, includes a radially outwardly extending flange 20 at its end adjacent push rod 18, which flange is engaged from behind by a sleeve 21 extending from control valve housing 17 to the low-pressure-chamber side of movable wall 2 and having there two collar portions 22 lying opposite to each other and being angled radially outwardly. Collar portions 22 engage behind the inner rims of radial ribs 23 constructed as flat tongues, ribs 23 being located in a common bottom plane of a cuplike, substantially cylindrical hub member 24 of diaphragm plate 10. Ribs 23, hub member 24 and diaphragm plate 10 are integrally made of sheet metal. Indentations 25 (so-called lancing) keep the ribs 23 in engagement with sleeve 21.

Both radial ribs 23 extend through two wide longitudinal slots 26 of reinforcement tube 5. A sliding element 27 which is made of plastics and is illustrated in FIGS. 2 to 4 as a component part, embraces the rims of longitudinal slot 26 and is guided axially therein.

A covering bead 28 of sliding element 27, which is adapted to the rim of longitudinal slot 26 adjacent working chamber 3, which is circular and of U-shaped cross-section construction, overlaps the rim of longitudinal slot 26 and abuts the surface of radial rib 23 adjacent working chamber 3.

A compression spring 29 bearing, on the one hand, against a plastic sleeve 30 incorporated in reinforcement tube 5 and, on the other hand, against a lower leg of covering bead 28, urges covering bead 28 against rib 23.

As shown best in FIG. 4, covering bead 28 is connected with each of its two ends to a different one of two guide shoes 31, which guide shoes are of U-shape cross-sectional construction, each embracing a different axially extending rim of an associated one of longitudinal slots 26 and is there guided movably in the axial direction. The free end of each of guide shoes 31 forms a stop 32, which cooperates with a ring 33 constituting the end portion of reinforcement tube 5, ring 33 forming a stop surface 34.

Upon actuation of the brake, wall 2 will move into low-pressure chamber 4 and, in doing so, will transmit a boosting force via sleeve 21 and control valve housing 17 to push rod 18 and the brake's master cylinder. Covering bead 28 will first remain in abutment with radial ribs 23 under the influence of compression spring 29, while guide shoes 31 move along the axially extending rims of longitudinal slots 26 until stop 32 abuts against stop surface 34.

The initial distance a between the front surface of rolling diaphragm 13 and the rim of covering bead 28 adjacent working chamber 3 as well as the distance b between stop 32 and stop surface 34 are chosen in the initial position such that sliding element 27 comes to a standstill by stop 32 abutting stop surface 34 when rolling diaphragm 13 reaches covering bead 28, with covering bead 28, however, overlapping the rim of longitudinal slots 26. When wall 2 moves further, rolling diaphragm 13 will continue to roll out on covering bead 28 of sliding element 27, which bead stands still.

As may be seen particularly clearly in FIG. 4, guide shoes 31 form a sliding guidance between the axially extending rim of rib 23 and the axially extending rims of longitudinal slot 26, so that a direct metallic friction is prevented from occuring between these parts.

While we have described above the principles of our invention in connection with specific apparatus it is to be clearly understood that this description is made only by way of example and not as a limitation to the scope of our invention as set forth in the objects thereof and in the accompanying claims.

We claim:

1. A brake booster for automotive vehicles comprising:
   a low-pressure casing sealingly subdivided into a low-pressure chamber and a working chamber by an axially movable wall;
   a reinforcement tube extending axially through said casing having its ends fastened to the end walls of said casing and sealed to said movable wall by a rolling diaphragm;
   a mechanically actuated control valve to connect said working chamber with a selected one of said low-pressure chamber and atmosphere, said control valve having a housing axially movable within said tube and connected to said movable wall by ribs extending radially through longitudinal slots disposed in said tube, said rolling diaphragm rolling over at least a portion of said slots adjacent said working chamber; and
   a sliding element engaging and axially guided by axially extending rims of each of said slots, said elements having means distinct from said wall to axially displace said elements together with said wall and each of said elements having a covering bead which overlaps said portion of said slots between said slots and said rolling diaphragm.

2. A brake booster according to claim 1, wherein:
   each of said elements is urged, in its initial position, against an associated one of said ribs by said means in the form of a spring and includes a stop to limit the axial movement thereof in a force boosting direction, said stop cooperating with a stop surface of said tube remote from said control valve.

3. A brake booster according to claim 2, wherein:
   each of said elements include guide shoes each embracing a different one of the axially extending rims of an associated one of said slots.

4. A brake booster according to claim 1, wherein:
   each of said elements include guide shoes each embracing a different one of the axially extending rims of an associated one of said slots.

5. A brake booster according to claim 3 or 4, wherein:
   said guide shoes each have a stop on the end thereof remote from said control valve to limit the axial movement of an associated one of said elements.

6. A brake booster according to claim 5, wherein:
   each of said guide shoes have a U-shaped cross-section.

7. A brake booster according to claim 6 wherein:
   said sliding element is made of plastic.

8. A brake booster according to claim 3 or 4, wherein:
   each of said guide shoes have a U-shaped cross-section.

9. A brake booster according to claim 8, wherein:
   said sliding element is made of plastic.

10. A brake booster according to claim 1 or 2, wherein:
    said covering bead has a U-shaped cross-section.

11. A brake booster according to claim 10, wherein:
    said sliding element is made of plastic.

12. A brake booster according to claim 1, 2, 3, or 4, wherein:
    said sliding element is made of plastic.

13. A brake booster according to claim 3 or 4, wherein:
    each of said guide shoes has a surface facing the inside of said associated one of said slots serving as a guide surface for said associated one of said ribs.

14. A brake booster according to claim 13, wherein:
    said sliding element is made of plastic.

* * * * *